(12) United States Patent
Hong et al.

(10) Patent No.: US 8,143,340 B2
(45) Date of Patent: Mar. 27, 2012

(54) POLYLACTIC ACID COMPOSITES

(75) Inventors: Chae Hwan Hong, Gyeonggi-do (KR); Do Suck Han, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 12/751,446

(22) Filed: Mar. 31, 2010

(65) Prior Publication Data

US 2011/0190437 A1  Aug. 4, 2011

(30) Foreign Application Priority Data

Feb. 1, 2010 (KR) ........................ 10-2010-0009244

(51) Int. Cl.
*C08K 3/04* (2006.01)
*C08L 51/00* (2006.01)

(52) U.S. Cl. ...................................... 524/496; 524/504

(58) Field of Classification Search .................... 524/496
See application file for complete search history.

(56) References Cited

U.S. PATENT DOCUMENTS

2007/0287795 A1   12/2007   Huda et al.
2008/0076880 A1*   3/2008   Nakagawa et al. ........... 525/190

FOREIGN PATENT DOCUMENTS

| | | |
|---|---|---|
| JP | 2007-145912 A | 6/2007 |
| JP | 2008-111043 A | 5/2008 |
| JP | 2009-096892 A | 5/2009 |
| KR | 10-0655532 | 9/2006 |
| KR | 10-0789103 | 12/2007 |
| KR | 10-2009-0050853 | 5/2009 |
| KR | 10-2009-0098994 | 9/2009 |

* cited by examiner

*Primary Examiner* — Ling Choi
*Assistant Examiner* — Hui Chin
(74) *Attorney, Agent, or Firm* — Edwards Wildman Palmer LLP; Peter F. Corless

(57) ABSTRACT

The present invention features polylactic acid composite compositions, more particularly a composite composition. The provided polylactic acid composite composition preferably includes the biomaterial polylactic acid resin and, accordingly, it is capable of effectively reducing carbon dioxide emission. Hence, it goes along with the low-carbon, green growth initiative. Further, with improved mechanical strength and heat resistance, it is usefully applicable to automotive interiors/exteriors, construction interiors, etc.

6 Claims, No Drawings

POLYLACTIC ACID COMPOSITES

CROSS-REFERENCE(S) TO RELATED APPLICATIONS

This application claims under 35 U.S.C. §119(a) the benefit of Korean Patent Application No. 10-2010-0009244, filed on Feb. 1, 2010, the entire contents of which are incorporated herein by reference.

BACKGROUND OF THE INVENTION

1. Field of the Invention

The present invention relates, generally, to a polylactic acid composite having superior heat resistance and mechanical strength and preferably being usefully applicable, for example, to automotive interiors/exteriors, construction interiors, etc.

2. Description of Related Art

Industrial growth since the 20th century can be largely attributed to fossil fuel resources, particularly petroleum resources. Keeping pace with the rapid industrial development and population growth, the consumption of petroleum resources has gradually increased. Since petroleum is not a renewable energy source, however, it has been repeatedly reported that the world's petroleum reserves will soon be depleted. Recently, carbon dioxide resulting from the combustion of fossil fuels has been drawing global attention as one of the main causes of global warming, and research has been focused on improving energy efficiency and finding alternative energy sources.

Polymers derived from a plant source, i.e., biomass, are obtained from renewable plant resources such as corn, beans, sugarcane and woods through a chemical or biological process. They are more important with regard to reduction of carbon dioxide production and consequent environmental protection than in the aspect of biodegradability. Of the biomass polymers, polylactic acid is a carbon neutral, environment-friendly, thermoplastic, linear aliphatic polyester obtained from fertilization of starches, for example, corn or potato, or from polymerization of sugar monomers resulting from glycosylation of plant-derived cellulose, followed by fertilization.

However, polylactic acid resin finds limited industrial applications because of poor physical properties when compared to other polymer materials. In particular, improvement of heat resistance and impact resistance is a prerequisite for application to automotive parts. Accordingly, attempts have been made to develop composites of polylactic acid by blending it with polypropylene resin. Since polypropylene resin is incompatible with polylactic acid resin due to differences in polarity, a compatibilizer is preferably be added. Japanese Patent Application Publication No. 2009-096892, incorporated by reference in its entirety herein, discloses addition of maleic anhydride grafted amorphous polypropylene to make polylactic acid resin compatible with polypropylene resin. The resulting composition has superior impact strength but insufficient tensile property. Japanese Patent Application Publication No. 2008-081585, incorporated by reference in its entirety herein, discloses use of a maleic anhydride grafted ethylene-propylene copolymer as a compatibilizer. Although the resulting composite has good heat resistance, its impact strength is not sufficient to be used for automotive parts. Further, Japanese Patent Application Publication No. 2008-111043, incorporated by reference in its entirety herein, aims at providing a composition with balanced tensile strength, heat resistance and impact strength using an amino modified elastomer as a compatibilizer. However, improvement of physical properties is insufficient for application to automotive interiors and exteriors. Korean Patent No. 10-789103, incorporated by reference in its entirety herein, discloses a polylactic acid-carbon nanotube composite prepared by mixing lactide with a carbon nanotube surface-treated with an acid to introduce carboxyl and hydroxyl groups and performing polymerization. The composite has superior electrical property and heat resistance but poor mechanical strength.

The above information disclosed in this the Background section is only for enhancement of understanding of the background of the invention and therefore it may contain information that does not form the prior art that is already known in this country to a person of ordinary skill in the art.

SUMMARY OF THE INVENTION

The present invention features a composite composition with superior heat resistance and mechanical properties, particularly impact strength, that may preferably be prepared by blending a polylactic acid resin in which a carbon nanotube is suitably dispersed by in-situ polymerization with a polypropylene resin and using a maleic anhydride grafted ethylene-octene copolymer resin as a suitable compatibilizer.

Accordingly, in preferred embodiments, an object of the present invention is to provide a composition with superior heat resistance and mechanical property capable of reducing the use of petroleum-based materials by blending a polylactic acid resin, a biomaterial effective in reducing carbon dioxide emission, with a polypropylene resin which is currently widely used for automotive interior and exterior parts.

The present invention preferably provides a polylactic acid composite composition including: a polylactic acid resin in which a carbon nanotube is suitably dispersed by in-situ polymerization; a polypropylene resin; and a maleic anhydride grafted ethylene-octene copolymer resin.

Preferably, the polylactic acid composite composition according to the present invention which includes the biomaterial polylactic acid is capable of suitably reducing the use of petroleum-based materials and is renewable after use. Accordingly, it goes along with the low-carbon, green growth initiative. Further, with superior heat resistance, it is directly applicable to existing polypropylene injection molding processes. In addition, with superior mechanical property including impact strength, it is usefully applicable to automotive interiors/exteriors, construction interiors, etc.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

DESCRIPTION OF SPECIFIC EMBODIMENTS

As described herein, the present invention includes a polylactic acid composite composition comprising a polylactic acid resin, a polypropylene resin, and a maleic anhydride grafted ethylene-octene copolymer resin.

In one embodiment, the polylactic resin further comprises a carbon nanotube is dispersed by in-situ polymerization.

The advantages, features and aspects of the invention will become apparent from the following description of the embodiments with reference to the accompanying drawings, which is set forth hereinbelow.

The present invention preferably provides a polylactic acid composite composition prepared by blending a polylactic acid resin in which a carbon nanotube is dispersed by in-situ polymerization so as to suitably improve heat resistance with a polypropylene resin preferably using a maleic anhydride grafted ethylene-octene copolymer resin as a compatibilizer.

In certain preferred embodiments, the polylactic acid resin in which a carbon nanotube is dispersed by in-situ polymerization is used in an amount of 100 parts by weight. Preferably, it may be prepared by, after mixing 80 to 90 wt % of a lactide monomer with 10 to 20 wt % of a carbon nanotube in a reactor, followed by heating to 180 to 190° C., adding 0.1 to 0.5 part by weight of a tin catalyst (tin 2-ethylhexanoate), based on 100 parts by weight of the reactants, while stirring for 4 to 5 hours. Further, if the carbon nanotube is used less than 10 wt %, heat resistance may be suitably insufficient. According to other preferred embodiments, if it is used in an amount exceeding 20 wt %, polymerization rate may suitably decrease and a high-molecular-weight polymer may not be obtained because of decreased dispersibility of the carbon nanotube. Preferably, the carbon nanotube is treated with an aqueous solution of sulfuric acid or nitric acid in advance so as to form carboxyl (—COOH) groups on the surface. The acid treatment results in increased compatibility with lactide. According to further preferred embodiments, if the reaction temperature is below 180° C., a long time is required to produce a suitably high-molecular-weight polymer because of slow reaction rate. Meanwhile, in other exemplary embodiments, if it is above 190° C., the carbon nanotube may not be uniformly dispersed. Therefore, it is preferred that the above range be maintained. Preferably, if the amount of the tin catalyst is too small, a long reaction time may be required. Meanwhile, in other exemplary embodiments, if the amount of the catalyst is too large, a polymer with a low molecular weight may be suitably obtained. Thus, it is preferred that the catalyst is used in an amount of 0.1 to 0.5 part by weight based on 100 parts by weight of the reactants.

Preferably, according to certain preferred embodiments, the polylactic acid resin in which a carbon nanotube is suitably dispersed by in-situ polymerization has a molecular weight of 80,000 to 150,000 g/mol. If the molecular weight is smaller than 80,000 g/mol, mechanical strength may be insufficient. According to certain preferred embodiments, if it is larger than 150,000 g/mol, suitable uniform dispersion may not be attained because of an excessively high melting point.

According to other preferred embodiments, the polypropylene resin, which is one of commonly used plastic resins, is easily available, inexpensive, prepared simply, very light because of low specific gravity and strong, has low thermal conductivity, does not absorb water, and has superior elasticity, chemical resistance and processability. Further, since it is a recyclable thermoplastic resin, its use is increasing gradually.

In preferred embodiments of the present invention, one selected from a propylene homopolymer, a propylene random copolymer and a propylene block copolymer may be used. Preferably, one having a melt index (MI) of 0.5 to 30 g/10 min (ASTM D 1238, 230° C.), more preferably 1.5 to 20 g/10 min, is used. According to certain preferred embodiments, if the melt index is too low, processability of the composite may be suitably degraded because of excessively high melt viscosity. And, if the melt index is too high, mechanical property may not be improved. Preferably, the polypropylene resin is used in an amount of 80 to 90 parts by weight based on 100 parts by weight of the polylactic acid resin in which a carbon nanotube is dispersed by in-situ polymerization. In certain preferred embodiments, if it is used less than 80 parts by weight, mechanical property may be suitably degraded because of shortage of the polypropylene resin. Meanwhile, if it is used in an amount exceeding 90 parts by weight, the content of the biomaterial polylactic acid is relatively low. Accordingly, it is preferred that the above range be maintained.

In certain preferred embodiments, the maleic anhydride grafted ethylene-octene copolymer resin is used as a compatibilizer of the polypropylene resin and the polylactic acid resin in which a carbon nanotube is dispersed by in-situ polymerization, which are incompatible because of different polarity. Preferably, it serves as a dispersant which uniformly disperses the particles of the polylactic acid resin in which a carbon nanotube is dispersed by in-situ polymerization in the polypropylene resin to micro scale and as a crosslinker which induces interfacial adhesion between the polypropylene resin and the polylactic acid resin in which a carbon nanotube is dispersed by in-situ polymerization and thereby improves mechanical property. Preferably, the maleic anhydride grafted ethylene-octene copolymer has a maleic anhydride graft ratio of 0.5 to 1.0 wt %. In certain preferred embodiments, if the graft ratio is below 0.5 wt %, the polylactic acid resin may not be uniformly dispersed because of low polarity. Further, if it exceeds 1.0 wt %, dispersibility of the polylactic acid resin may decrease because of excessively high melt viscosity. Accordingly, in certain preferred embodiments, it is preferred that the above range be suitably maintained. Preferably, the maleic anhydride grafted ethylene-octene copolymer is used in an amount of 10 to 20 parts by weight based on 100 parts by weight of the polylactic acid resin in which a carbon nanotube is dispersed by in-situ polymerization. If it is used less than 10 parts by weight, impact strength of the composition may be degraded because the polylactic acid resin is not uniformly dispersed. In other exemplary embodiments, if is used in an amount exceeding 20 parts by weight, mechanical strength may not be improved. Accordingly, it is preferred that the above range be maintained.

In certain preferred embodiments, the polylactic acid composite composition of the present invention may be formed into automotive interiors/exteriors or construction interiors as follows.

First, 80 to 90 wt % of a lactide monomer and 10 to 20 wt % of a carbon nanotube are mixed in a reactor. Preferably, after heating to 180 to 190° C., 0.1 to 0.5 part by weight of a tin catalyst (tin 2-ethylhexanoate) based on 100 parts by weight of the reactants is added while stirring 4 to 5 hours to prepare a polylactic acid resin in which a carbon nanotube is dispersed by in-situ polymerization. In further preferred embodiments, 100 parts by weight of the polylactic acid resin in which a carbon nanotube is dispersed by in-situ polymerization is completely mixed with 80 to 90 parts by weight of a polypropylene resin and 10 to 20 parts by weight of a maleic anhydride grafted ethylene-octene copolymer using a mixing machine such as a blender or a hopper. Further, preferably, the mixed material is melt extruded using an extruder into a pellet. Preferably, the extruded pellet is heated to 200 to 220° C. and then injection molded in a mold of 30 to 50° C. to obtain a product with a desirable shape.

Preferably, the polylactic acid composite composition according to the present invention which comprises the biomaterial polylactic acid is capable of suitably reducing the use of petroleum-based materials, is renewable after use, and, because of superior heat resistance and mechanical property including impact strength, is usefully applicable to automotive interiors/exteriors such as, but not limited to, dash outer silencer, dash inner silencer, hood silencer, door pad, door trim, headliner, package tray, trunk mat, construction interiors, etc.

EXAMPLES

The following examples are for illustrative purposes only and not intended to limit the scope of the present invention.

Preparation Example 1

80 wt % of a lactide monomer (Musashino Chemical) and 20 wt % of a multi-walled carbon nanotube (Hanwha Nanotech) were mixed. After heating to 190° C., 0.5 parts by weight of a tin catalyst (tin 2-ethylhexanoate or stannous octoate, Aldrich) based on 100 parts by weight of the reactants was added while stirring for 4 hours to prepare a polylactic acid resin in which a carbon nanotube is dispersed by in-situ polymerization.

Preparation Example 2

A polylactic acid resin in which a carbon nanotube is dispersed by in-situ polymerization was prepared in the same manner as in Preparation Example 1, except for using 90 wt % of a lactide monomer and 10 wt % of a multi-walled carbon nanotube.

Examples 1 and 2

The polylactic acid resin in which a carbon nanotube is dispersed by in-situ polymerization, a polypropylene resin and a maleic anhydride grafted ethylene-octene copolymer resin were mixed in dry state and, after adding to a twin screw extruder, melt mixed at 230° C., i.e., above the melting point, to prepare a composite composition. The composition is given in Table 1.

Comparative Example 1

A polylactic acid resin in which a carbon nanotube is not dispersed, a polypropylene resin and a maleic anhydride grafted amorphous polypropylene resin were mixed in dry state and, after adding to a twin screw extruder, melt mixed at 230° C. to prepare a composite composition. The composition is given in Table 1.

Comparative Examples 2 to 4

A composite composition was prepared in the same manner as in Comparative Example 1, except for using a maleic anhydride grafted crystalline polypropylene resin (Comparative Example 2), a maleic anhydride grafted ethylene-propylene copolymer resin (Comparative Example 3) and an amino modified styrene-ethylene-butylene-styrene block copolymer resin (Comparative Example 4), respectively, instead of the maleic anhydride grafted amorphous polypropylene resin.

TABLE 1

|  | Examples | | Comparative Examples | | | |
| --- | --- | --- | --- | --- | --- | --- |
|  | 1 | 2 | 1 | 2 | 3 | 4 |
| A-1 (parts by weight) | 100 | — | — | — | — | — |
| A-2 (parts by weight) | — | 100 | — | — | — | — |
| A-3 (parts by weight) | — | — | 100 | 100 | 100 | 100 |
| B (parts by weight) | 80 | 90 | 90 | 90 | 90 | 90 |
| C-1 (parts by weight) | 20 | 10 | — | — | — | — |
| C-2 (parts by weight) | — | — | 10 | — | — | — |
| C-3 (parts by weight) | — | — | — | 10 | — | — |
| C-4 (parts by weight) | — | — | — | — | 10 | — |
| C-5 (parts by weight) | — | — | — | — | — | 10 |

A-1: Polylactic acid resin in which a carbon nanotube is dispersed prepared in Preparation Example 1
A-2: Polylactic acid resin in which a carbon nanotube is dispersed prepared in Preparation Example 2
A-3: Commercially available polylactic acid resin (Nature Works)
B: Polypropylene random copolymer resin (R724, LG-Caltex)
C-1: Maleic anhydride grafted ethylene-octene copolymer resin (Aldrich)
C-2: Maleic anhydride grafted amorphous polypropylene resin (Tuf-selen T4535MA, Sumitomo Chemical)
C-3: Maleic anhydride grafted crystalline polypropylene resin (Umex 1010, Sanyo Chemical Industries)
C-4: Maleic anhydride grafted ethylene-propylene copolymer resin (MP0620, Mitsui Chemical)
C-5: Amino modified styrene-ethylene-butylene-styrene block copolymer resin (Dynaron 8630P, JSR)

Test Example

Measurement of Physical Properties

In order to measure the mechanical properties of the composite compositions prepared in Examples 1 and 2 and Comparative Examples 1 to 4, test specimens were prepared by injection molding and physical properties were measured according to ASTM D 638, ASTM D 256, ASTM D 790 and ASTM D 648. The result is given in Table 2. The specimen for tensile property measurement was dumbbell-shaped and that for impact strength measurement had notches formed thereon.

1) Tensile Property

A test specimen was prepared according to ASTM D 638 (Standard Test Method for Tensile Properties of Plastics) and tensile strength, elongation and tensile modulus were measured using a universal testing machine.

2) Impact Strength

A test specimen was prepared according to ASTM D 256 (Standard Test Methods for Determining the Izod Pendulum Impact Resistance of Plastics) and impact strength was measured using an Izod impact tester.

3) Flexural Modulus

A test specimen was prepared according to ASTM D 790 (Standard Test Methods for Flexural Properties of Unreinforced and Reinforced Plastics and Electrical Insulating Materials) and flexural modulus was measured using a universal testing machine.

4) Heat Resistance

A test specimen was prepared according to ASTM D 648 (Standard Test Method for Deflection Temperature of Plastics Under Flexural Load in the Edgewise Position) and heat resistance was measured using a universal testing machine.

TABLE 2

|  | Examples | | Comparative Examples | | | |
| --- | --- | --- | --- | --- | --- | --- |
|  | 1 | 2 | 1 | 2 | 3 | 4 |
| Tensile strength (MPa) | 284 | 287 | 140 | 136 | 124 | 135 |
| Elongation (%) | 480 | 460 | 145 | 181 | 185 | 175 |

TABLE 2-continued

| | Examples | | Comparative Examples | | | |
|---|---|---|---|---|---|---|
| | 1 | 2 | 1 | 2 | 3 | 4 |
| Tensile modulus (MPa) | 1500 | 1450 | 550 | 570 | 560 | 540 |
| Impact strength (kJ/m$^2$) | 18 | 19 | 16 | 7 | 4 | 3 |
| Flexural modulus (MPa) | 12500 | 12600 | 8500 | 8400 | 10900 | 9200 |
| Heat resistance (° C.) | 120 | 119 | 93 | 91 | 114 | 89 |

As shown in Table 2, Comparative Example 1 wherein a maleic anhydride grafted amorphous polypropylene resin was used as a compatibilizer exhibited good impact strength but low tensile property. Comparative Example 3 wherein a maleic anhydride grafted ethylene-propylene copolymer resin was used showed superior heat resistance and flexural modulus but impact strength and tensile property were insufficient to be used for automotive interiors and exteriors. When compared with Comparative Example 4 wherein an amino modified elastomer was used, the polylactic acid composite composition of the present invention wherein a maleic anhydride grafted ethylene-octene copolymer resin was used showed better mechanical strength and heat resistance.

As described herein, the polylactic acid composite composition of the present invention wherein a polylactic acid resin in which a carbon nanotube is suitably dispersed by in-situ polymerization is blended with a polypropylene resin using a maleic anhydride grafted ethylene-octene copolymer resin as a compatibilizer has superior impact strength ($\geq$18 kJ/m$^2$) and heat resistance ($\geq$110° C.) satisfying the requirements of automotive interiors and exteriors as well as better tensile property as compared to existing polylactic acid composite compositions. Accordingly, it is usefully applicable to automotive interiors/exteriors such as, but not limited to, dash outer silencer, dash inner silencer, hood silencer, door pad, door trim, headliner, package tray, trunk mat, construction interiors, etc.

While the present invention has been described with respect to the specific embodiments, it will be apparent to those skilled in the art that various changes and modifications may be made without departing from the spirit and scope of the invention as defined in the following claims.

What is claimed is:

1. A polylactic acid composite composition comprising:
   a polylactic acid resin in which a carbon nanotube is dispersed by in-situ polymerization;
   a polypropylene resin; and
   a maleic anhydride grafted ethylene-octene copolymer resin.

2. The polylactic acid composite composition according to claim 1, which comprises:
   100 parts by weight of the polylactic acid resin in which a carbon nanotube is dispersed by in-situ polymerization;
   80 to 90 parts by weight of the polypropylene resin; and
   10 to 20 parts by weight of the maleic anhydride grafted ethylene-octene copolymer resin.

3. The polylactic acid composite composition according to claim 1, wherein the polylactic acid resin in which a carbon nanotube is dispersed by in-situ polymerization is prepared by adding the tin 2-ethylhexanoate as a tin catalyst to a mixture of 80 to 90 wt % of a lactide monomer and 10 to 20 wt % of a carbon nanotube and has a molecular weight of 80,000 to 150,000 g/mol.

4. The polylactic acid composite composition according to claim 1, wherein the carbon nanotube is treated with an aqueous solution of sulfuric acid or nitric acid so as to form carboxyl (—COOH) groups on the surface.

5. The polylactic acid composite composition according to claim 1, wherein the polypropylene resin is selected from a propylene homopolymer, a propylene random copolymer and a propylene block copolymer and has a melt index (MI) of 0.5 to 30 g/10 min (ASTM D 1238, 230° C.).

6. The polylactic acid composite composition according to claim 1, wherein the maleic anhydride grafted ethylene-octene copolymer resin has a maleic anhydride graft ratio of 0.5 to 1.0 wt %.

* * * * *